(12) United States Patent
Albrecht et al.

(10) Patent No.: US 10,335,883 B2
(45) Date of Patent: Jul. 2, 2019

(54) GRAVITY-BASED WELD TRAVEL SPEED SENSING SYSTEM AND METHOD

(71) Applicant: ILLINOIS TOOL WORKS INC., Glenview, IL (US)

(72) Inventors: Bruce Patrick Albrecht, Neenah, WI (US); William Todd Watson, Mount Prospect, IL (US)

(73) Assignee: Illinois Tool Works Inc., Glenview, IL (US)

( * ) Notice: Subject to any disclaimer, the term of this patent is extended or adjusted under 35 U.S.C. 154(b) by 669 days.

(21) Appl. No.: 14/297,380

(22) Filed: Jun. 5, 2014

(65) Prior Publication Data
US 2015/0352653 A1   Dec. 10, 2015

(51) Int. Cl.
| | | |
|---|---|---|
| *B23K 9/00* | (2006.01) | |
| *B23K 9/028* | (2006.01) | |
| *B23K 9/095* | (2006.01) | |
| *B23K 101/06* | (2006.01) | |
| *B23K 101/10* | (2006.01) | |

(52) U.S. Cl.
CPC .......... *B23K 9/0026* (2013.01); *B23K 9/0286* (2013.01); *B23K 9/0956* (2013.01); *B23K 2101/06* (2018.08); *B23K 2101/10* (2018.08)

(58) Field of Classification Search
CPC .. B23K 9/0956; B23K 9/0026; B23K 9/0288; B23K 9/0253; B23K 9/013; B23K 9/0286; B23K 9/0282
USPC ........... 219/60.2, 61.5, 76.14, 124.4, 137.31, 219/137.2, 124.34; 434/234; 348/208.99; 33/301, 365
See application file for complete search history.

(56) References Cited

U.S. PATENT DOCUMENTS

| | | | | |
|---|---|---|---|---|
| 3,509,314 A | * | 4/1970 | Freytag | B23K 9/133 219/137.31 |
| 3,651,290 A | | 3/1972 | Durbin | |
| 4,163,886 A | | 8/1979 | Omae | |
| 4,179,818 A | * | 12/1979 | Craig | G01C 21/16 33/321 |
| 4,931,018 A | * | 6/1990 | Herbst | G09B 19/24 345/10 |

(Continued)

FOREIGN PATENT DOCUMENTS

| | | |
|---|---|---|
| JP | S5527422 | 2/1980 |
| JP | H05141909 | 6/1993 |

(Continued)

OTHER PUBLICATIONS

International Search Report from PCT application No. PCT/US2015/028939, dated Oct. 14, 2015, 13 pgs.

(Continued)

*Primary Examiner* — Jimmy Chou
(74) *Attorney, Agent, or Firm* — McAndrews, Held & Malloy, Ltd.

(57) ABSTRACT

A welding system includes an orientation sensing system associated with a welding torch and is configured to sense a welding torch orientation relative to a direction of gravity. The welding system also includes a processing system communicatively couple to the orientation sensing system and configured to determine an angular position of the welding torch relative to a pipe based at least in part on the sense welding torch orientation.

17 Claims, 5 Drawing Sheets

(56) References Cited

U.S. PATENT DOCUMENTS

| | | | | |
|---|---|---|---|---|
| 6,563,085 B2* | 5/2003 | Lanouette | | B23K 9/095 |
| | | | | 219/130.5 |
| 6,710,298 B2* | 3/2004 | Eriksson | | A61F 9/06 |
| | | | | 219/130.01 |
| 7,564,404 B2* | 7/2009 | Katz | | G01S 5/0231 |
| | | | | 342/357.31 |
| 7,683,290 B2* | 3/2010 | Daniel | | B23K 9/0953 |
| | | | | 219/130.01 |
| 7,962,967 B2* | 6/2011 | Becker | | A61F 9/06 |
| | | | | 2/8.1 |
| 8,061,047 B2* | 11/2011 | Igarashi | | E21B 47/01 |
| | | | | 33/302 |
| 8,316,462 B2* | 11/2012 | Becker | | A61F 9/06 |
| | | | | 2/8.1 |
| 8,536,817 B2* | 9/2013 | Louis | | H01L 21/67742 |
| | | | | 318/568.12 |
| 8,680,434 B2* | 3/2014 | Stoger | | B23K 9/0956 |
| | | | | 219/136 |
| 8,747,116 B2* | 6/2014 | Zboray | | G09B 19/24 |
| | | | | 219/130.21 |
| 8,834,168 B2 | 9/2014 | Peters | | |
| 8,851,896 B2* | 10/2014 | Wallace | | G09B 5/00 |
| | | | | 200/512 |
| 8,911,237 B2 | 12/2014 | Postlethwaite | | |
| 8,915,740 B2 | 12/2014 | Zboray | | |
| 9,011,154 B2 | 4/2015 | Kindig | | |
| 9,352,411 B2* | 5/2016 | Batzler | | B23K 9/32 |
| 2003/0061001 A1* | 3/2003 | Willins | | G01S 5/0284 |
| | | | | 702/153 |
| 2005/0230379 A1* | 10/2005 | Martawibawa | | B23K 9/0286 |
| | | | | 219/617 |
| 2005/0251294 A1* | 11/2005 | Cerwin | | B25F 5/022 |
| | | | | 700/279 |
| 2005/0285948 A1* | 12/2005 | Weinberg | | G01P 15/0888 |
| | | | | 348/208.99 |
| 2007/0051711 A1* | 3/2007 | Kachline | | B23K 9/1056 |
| | | | | 219/130.01 |
| 2007/0187378 A1* | 8/2007 | Karakas | | B23K 9/1087 |
| | | | | 219/130.21 |
| 2008/0149608 A1* | 6/2008 | Albrecht | | B23K 9/123 |
| | | | | 219/130.1 |
| 2008/0169277 A1* | 7/2008 | Achtner | | B23K 9/167 |
| | | | | 219/136 |
| 2008/0314887 A1* | 12/2008 | Stoger | | B23K 9/0956 |
| | | | | 219/137 R |
| 2009/0231423 A1* | 9/2009 | Becker | | A61F 9/06 |
| | | | | 348/82 |
| 2009/0276930 A1* | 11/2009 | Becker | | A61F 9/06 |
| | | | | 2/8.2 |
| 2009/0298024 A1* | 12/2009 | Batzler | | B23K 9/32 |
| | | | | 434/234 |
| 2010/0062405 A1* | 3/2010 | Zboray | | G09B 19/24 |
| | | | | 434/234 |
| 2010/0062406 A1* | 3/2010 | Zboray | | G09B 19/24 |
| | | | | 434/234 |
| 2010/0103036 A1* | 4/2010 | Malone | | B60R 25/24 |
| | | | | 342/357.34 |
| 2010/0224610 A1* | 9/2010 | Wallace | | B23K 9/0953 |
| | | | | 219/137 R |
| 2011/0220628 A1* | 9/2011 | Mehn | | B23K 9/124 |
| | | | | 219/130.1 |
| 2011/0220629 A1* | 9/2011 | Mehn | | B23K 9/125 |
| | | | | 219/136 |
| 2011/0316516 A1 | 12/2011 | Schiefermuller | | |
| 2012/0012561 A1* | 1/2012 | Wiryadinata | | B23K 9/0956 |
| | | | | 219/108 |
| 2012/0057240 A1 | 3/2012 | Sundell | | |
| 2012/0067859 A1 | 3/2012 | Albrecht | | |
| 2012/0111837 A1* | 5/2012 | Al-Mostaneer | | B23K 9/0284 |
| | | | | 219/73 |
| 2012/0273473 A1 | 11/2012 | Zhang | | |
| 2013/0040270 A1* | 2/2013 | Albrecht | | B23K 9/00 |
| | | | | 434/234 |
| 2013/0068743 A1* | 3/2013 | Delin | | B23K 37/0258 |
| | | | | 219/130.01 |
| 2013/0081293 A1* | 4/2013 | Delin | | G01B 21/16 |
| | | | | 33/301 |
| 2013/0112660 A1* | 5/2013 | Enyedy | | B23K 9/0956 |
| | | | | 219/74 |
| 2013/0112677 A1* | 5/2013 | Christopher | | B23K 9/1333 |
| | | | | 219/137.71 |
| 2013/0189656 A1* | 7/2013 | Zboray | | G06F 3/011 |
| | | | | 434/219 |
| 2013/0189657 A1* | 7/2013 | Wallace | | G09B 5/00 |
| | | | | 434/234 |
| 2013/0189658 A1* | 7/2013 | Peters | | G09B 5/00 |
| | | | | 434/234 |
| 2013/0206740 A1* | 8/2013 | Pfeifer | | B23K 9/095 |
| | | | | 219/124.5 |
| 2013/0206741 A1* | 8/2013 | Pfeifer | | B23K 9/095 |
| | | | | 219/130.01 |
| 2013/0208569 A1 | 8/2013 | Pfeifer | | |
| 2013/0284712 A1* | 10/2013 | Sauron | | B23K 9/0026 |
| | | | | 219/125.1 |
| 2014/0014637 A1* | 1/2014 | Hunt | | B25J 9/1689 |
| | | | | 219/124.22 |
| 2014/0027427 A1* | 1/2014 | Fosbinder | | B23K 9/095 |
| | | | | 219/133 |
| 2014/0069899 A1* | 3/2014 | Mehn | | B23K 9/0953 |
| | | | | 219/130.01 |
| 2014/0134580 A1* | 5/2014 | Becker | | G09B 9/00 |
| | | | | 434/234 |
| 2014/0263227 A1* | 9/2014 | Daniel | | B23K 9/0956 |
| | | | | 219/130.01 |

FOREIGN PATENT DOCUMENTS

| | | |
|---|---|---|
| KR | 20130048580 | 5/2013 |
| WO | 9934950 | 7/1999 |

OTHER PUBLICATIONS

International Search Report from PCT application No. PCT/US2015/041462, dated Dec. 4, 2015, 14 pgs.

Sternowski, Andreas; "Handheld Welding Torch with Position Detection," Patente Fonds, Patent Portfolio, Sep. 21, 2011.

* cited by examiner

GRAVITY-BASED WELD TRAVEL SPEED SENSING SYSTEM AND METHOD

BACKGROUND

The invention relates generally to welding systems, and, more particularly, to sensing systems for monitoring a travel speed of a welding torch during a welding operation.

Welding is a process that has become ubiquitous in various industries for a variety of types of applications. For example, welding is often performed in applications such as shipbuilding, aircraft repair, construction, and so forth. While these welding operations may be automated in certain contexts, there still exists a need for manual welding operations. In some manual welding operations, it may be desirable to monitor weld parameters, such as the travel speed of the welding torch in three-dimensional space, throughout the welding operation. While the travel speed of an automated torch may be robotically controlled, the travel speed of the welding torch in manual operations may depend on the operator's welding technique, the weld pattern and position, the experience of the welding operator, and so forth. Unfortunately, it may be difficult to measure this weld motion during a welding operation due to features of the welding environment, operator considerations, and so forth.

BRIEF DESCRIPTION

In a first embodiment, a welding system includes an orientation sensor associated with a welding torch and configured to sense a welding torch orientation relative to a direction of gravity. The welding system also includes a processing system communicatively couple to the orientation sensor and configured to determine an angular position of the welding torch relative to a pipe based at least in part on the sense welding torch orientation.

In another embodiment, a method includes sensing an initial orientation of a welding torch at an initial location of a pipe using one or more orientation sensors. The method also includes sensing an angular orientation of the welding torch at an angular location of the pipe using the one or more orientation sensors. The method further includes determining an angular change in orientation between the initial orientation and the angular orientation. Furthermore, the method includes deriving a travel distance of the welding torch from the initial location to the angular location based on the angular change and a radius of the pipe at a weld joint.

In a further embodiment, a retro-fit kit configured to couple to a welding torch includes an accelerometer configured to determine an initial orientation of the welding torch and a subsequent angular orientation. The retro-fit kit also includes a processor configured to determine an angular change in orientation between the initial orientation and the subsequent angular orientation. The processor is also configured to cause the processor to derive a travel speed of the welding torch based on a travel distance from the initial location to the angular location determined using the angular change and a radius of the pipe at a weld joint.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
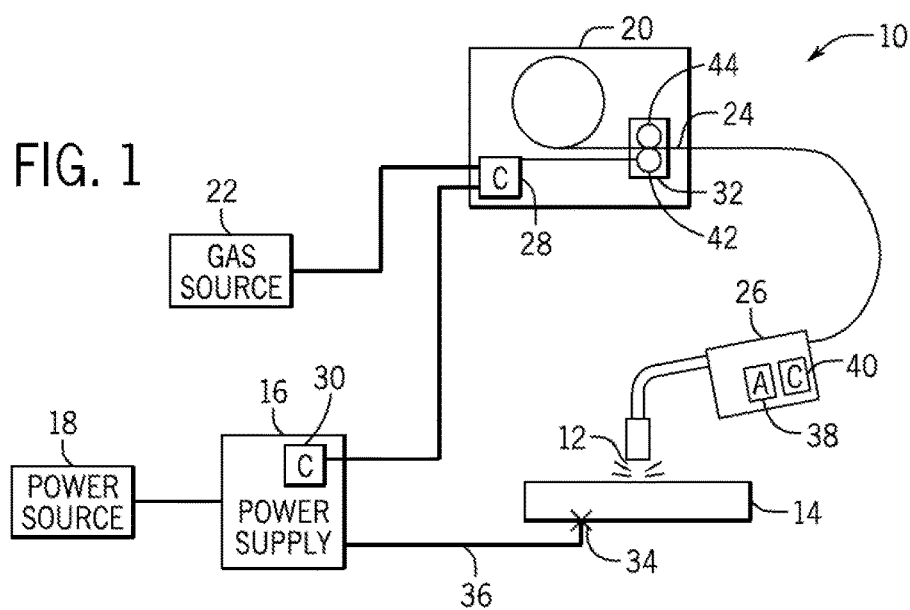
FIG. 1 is a block diagram of an embodiment of a welding system utilizing a welding torch with travel speed determination as disclosed.

As described in detail below, provided herein are systems and methods for determining the travel speed of a welding device during a welding operation. The foregoing systems and methods may be used separately or in combination to obtain information during the welding operation relating to the three dimensional speed of the welding torch along the surface of the metal as the metal is being welded. In some embodiments, these methods may be utilized during unconstrained or manual welding operations to offer advantages over traditional systems in which it may be difficult to measure the weld motion. However, the foregoing systems and methods may also be utilized in a variety of suitable welding systems, such as automated or robotic systems.

Interpass temperatures are important in the micro-structural properties of weldments, such as yield and tensile strength. One method of estimating and/or limiting interpass temperatures may include estimating travel speed. High interpass temperatures that may result from slow travel speed cause a reduction in strength of the welded connection and/or surrounding metal. Slow travel speed also may result in overbeading welded connections and inefficient welding by an operator. Travel speeds that are too fast may indicate that the welding connection is incompletely formed. Present embodiments are directed toward systems and methods for sensing a travel speed of a welding torch using one or more orientation sensors (e.g., accelerometer sensors and/or gyroscope sensors). The orientation sensors may be disposed on, physically coupled to, or in communication with the welding torch. The travel speed sensing system is configured to detect a position and an orientation of the welding torch relative to a workpiece. In some embodiments, the orientation sensors may include gravity sensors (e.g., accelerometers), sensors for measuring angular change (e.g., gyroscopes) or other sensors suitable for tracking an orientation of the welding torch.

As discussed below, in some embodiments, the orientation sensor(s) may be utilized to monitor an angular position of the welding torch relative to a workpiece, such as a pipe workpiece. Certain embodiments also include one or more other sensors connected to or and/or located in the welding torch. The travel speed sensing system is configured to determine or detect the travel speed based on orientations determined from the orientation sensors. Using an expected travel angle and location, an expected orientation may be determined and used to compare to orientations measured via orientation sensors (generally referred to herein as "orientation sensors; e.g., accelerometers, gyroscopes). The travel angle may vary according to a travel profile that may be manually input, a standard travel angle, or a travel angle that is learned through a teaching process prior to welding. Furthermore, in some embodiments, the orientation sensors may be used to determine an inclination angle of the workpiece to be welded, such as one or more segments of pipe in order to translate gravity direction data into orientation of the welding torch in relation to the workpiece.

Turning now to the figures, FIG. 1 is a block diagram of an embodiment of a welding system 10 in accordance with the present techniques. The welding system 10 is designed to produce a welding arc 12 with a workpiece 14 (e.g., pipe). The welding arc 12 may be generated by any type of welding system or process, and may be oriented in any desired manner. For example, such welding systems may include gas metal arc welding (GMAW) systems, and may utilize various programmed waveforms and settings. The welding system 10 includes a power supply 16 that will typically be coupled to a power source 18, such as a power grid. Other power sources may, of course, be utilized including generators, engine-driven power packs, and so forth. In the illustrated embodiment, a wire feeder 20 is coupled to a gas source 22 and the power source 18, and supplies welding wire 24 to a welding torch 26. The welding torch 26 is configured to generate the welding arc 12 between the welding torch 26 and the workpiece 14. The welding wire 24 is fed through the welding torch 26 to the welding arc 12, melted by the welding arc 12, and deposited on the workpiece 14.

The wire feeder 20 will typically include control circuitry, illustrated generally by reference numeral 28, which regulates the feed of the welding wire 24 from a spool, and commands the output of the power supply 16, among other things. Similarly, the power supply 16 may include control circuitry 30 for controlling certain welding parameters and arc-starting parameters. The spool will contain a length of welding wire 24 that is consumed during the welding operation. The welding wire 24 is advanced by a wire drive assembly 32, typically through the use of an electric motor under control of the control circuitry 28. In addition, the workpiece 14 is coupled to the power supply 16 by a clamp 34 connected to a work cable 36 to complete an electrical circuit when the welding arc 12 is established between the welding torch 26 and the workpiece 14.

Placement of the welding torch 26 at a location proximate to the workpiece 14 allows electrical current, which is provided by the power supply 16 and routed to the welding torch 26, to arc from the welding torch to the workpiece 14. As described above, this arcing completes an electrical circuit that includes the power supply 16, the welding torch 26, the workpiece 14, and the work cable 36. Particularly, in operation, electrical current passes from the power supply 16, to the welding torch 26, to the workpiece 14, which is typically connected back to the power supply 16 via the work cable 36. The arc generates a relatively large amount of heat that causes part of the workpiece 14 and the filler metal of the welding wire 24 to transition to a molten state that fuses the materials, forming the weld.

To shield the weld area from being oxidized or contaminated during welding, to enhance arc performance, and to improve the resulting weld, the welding system 10 may also feed an inert shielding gas to the welding torch 26 from the gas source 22. It is worth noting, however, that a variety of shielding materials for protecting the weld location may be employed in addition to, or in place of, the inert shielding gas, including active gases and particulate solids. Moreover, in other welding processes, such gases may not be used, while the techniques disclosed herein are equally applicable.

Presently disclosed embodiments are directed to an angular-based travel speed sensing system used to detect a change in position of the welding torch 26 over time throughout the welding process. In some embodiments, the travel speed of the welding torch 26 may refer to a change in three dimensional position with respect to time measured using at least an accelerometer 38 and/or gyroscope sensor 40 located in, on, or associated with the welding torch 26. In certain embodiments, the accelerometer 38 may include a single triaxial accelerometer capable of measuring dynamic motion, such as weld weaving. In other embodiments, the travel speed of the welding torch 26 may refer to a change in two-dimensional of the welding torch 26 determined using two orientation sensors (e.g., accelerometers). For example, the two-dimensional position may be calculated with respect to a plane parallel to a direction of gravity. As mentioned above, although FIG. 1 illustrates a GMAW system, the presently disclosed techniques may be similarly applied across other types of welding systems, including gas tungsten arc welding (GTAW) systems and shielded metal arc welding (SMAW) systems, among others. Accordingly, embodiments of the welding travel speed sensing system may be utilized with welding systems that include the wire feeder 20 and gas source 22 or with systems that do not include a wire feeder and/or a gas source, depending on implementation-specific considerations.

Figure 2:
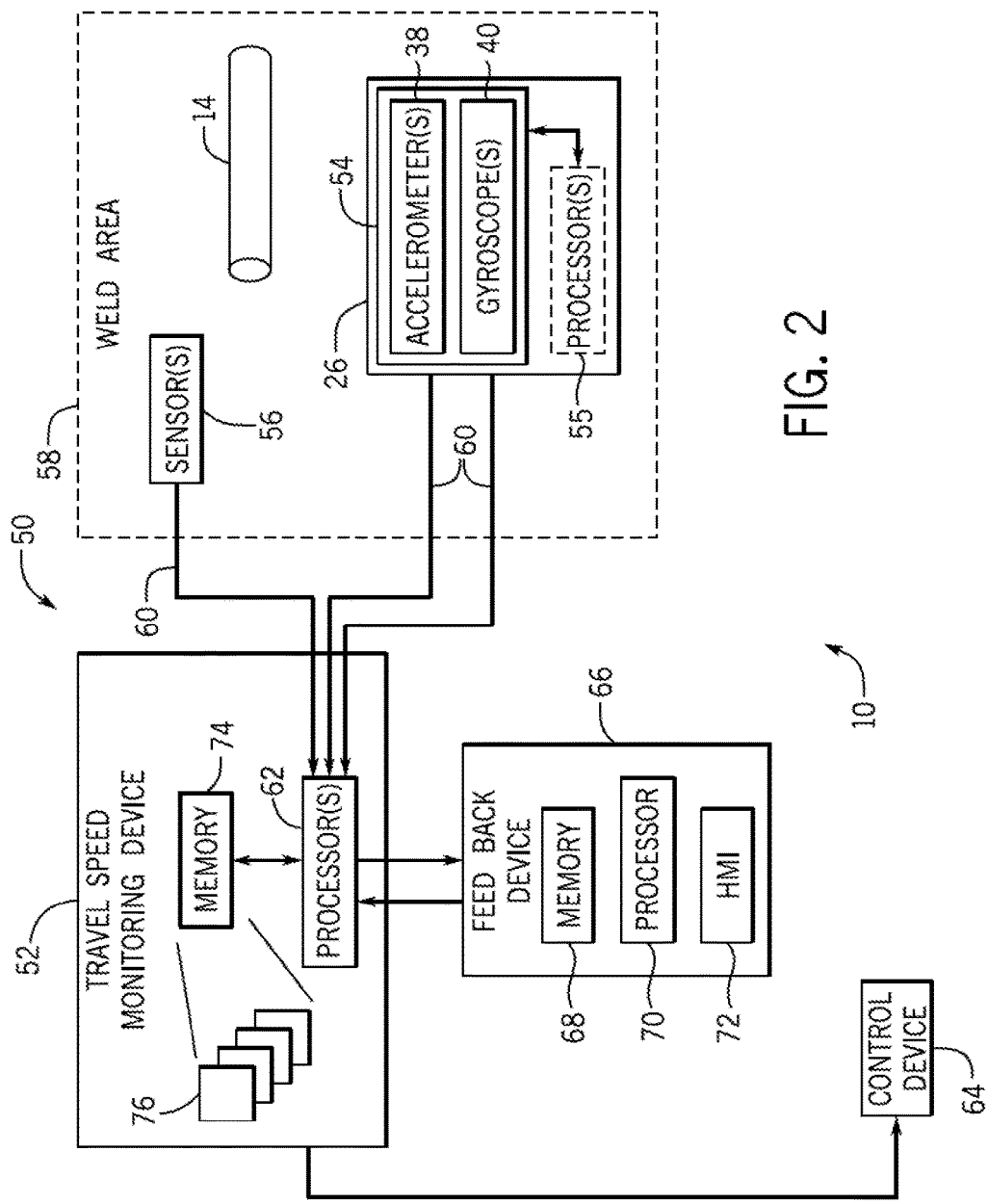
FIG. 2 is a block diagram of an embodiment of the welding system of FIG. 1, including a travel speed sensing system for detecting a travel speed of the welding torch.

FIG. 2 is a block diagram of an embodiment of the welding system 10, including a travel speed sensing system 50 in accordance with presently disclosed techniques. The travel speed sensing system 50 may include, among other things, a travel speed monitoring device 52 configured to process signals received from one or more sensors 54 (e.g., accelerometers, gyroscopes, etc.) incorporated within or connected to the welding torch 26 (e.g., via an add-on kit). As discussed in detail below, the sensors 54 may be utilized to determine a position of the welding torch 26 around the workpiece 14. In some embodiments, the welding torch 26 and/or a welding torch add-on kit may include one or more processor(s) 55 that may analyze and transform measurements from the sensors 54 and be physically coupled onto the welding torch 26 (e.g., via a housing). In some embodiments, the sensor 54 and/or processor 55 may include shielding for one or more components.

The welding system 10 may also include one or more sensors 56 located within a weld area 58 external to the welding torch 26 and capable of capturing various details about a welding technique used to weld the workpiece 14. The sensors 56 may be any desirable type of sensor that produces a signal indicative of a position of the welding torch 26, an orientation of the welding torch 26, and/or temperature of various portions of the workpiece 14 within a weld area 58. The weld area 58 may include any three-dimensional space within which a welding operation is performed via the welding system 10. For example, the sensors 56 may include an array of microphones configured to detect a position of a welding arc 12, a sound emitter disposed on the welding torch 26, or any other sound indicative of a position of the welding torch 26 operating in the weld area 58. In other embodiments, the sensors 56 may include one or more optical sensors configured to sense a light emitted from the welding torch 26 (e.g., welding arc 12). In some embodiments, one or more of the sensors 56 may be located on a welding helmet to aid in determining a position of the welding torch 26.

The one or more sensors 54, 56 and/or the processor(s) 55 may send signals 60 indicative of welding torch position to the travel speed monitoring device 52. Using the signals 60, the travel speed monitoring device 52 may then determine a position of the welding torch 26 based at least in part on the signals 60 sent from the sensors (e.g., the accelerometer(s) 38 and/or gyroscope(s) 40). That is, the travel speed sensing system 50 may receive the signals 60, and determine the travel speed of the welding torch 26 based on these signals 60. In some embodiments, the workpiece 14 may be placed in any spatial relationship to the sensors 56, and a calibration scheme may be applied via the weld travel speed system 50. For example, the welding torch 26 may be placed at one or more known positions relative to the workpiece 14, and sensor measurements taken at these positions may be used to calibrate the spatial relationship between the workpiece 14 and the sensors 56.

As shown, the travel speed monitoring device 52 may include a processor 62, which receives inputs such as sensor data from the sensors 54, sensors 56 and/or the processor(s) 55 via the signals 60. Each signal may be communicated over a communication cable, or wireless communication system (e.g., ZigBee®), from the one or more sensors 54, 56. In an embodiment, the processor 62 may also send control commands to a control device 64 of the welding system 10 in order to implement appropriate actions within the welding system 10. For example, the control device 64 may control a welding parameter (e.g., power output, wire feed speed, gas flow, etc.) based on the determined travel speed of the welding torch 26. The processor 62 also may be coupled with a feedback device 66 that provides an indicator of travel speed of the welding torch 26 based on input from the sensors 54, 56. In some embodiments, the feedback device 66 includes a memory 68 and processor(s) 70 separate from the processor of the travel speed monitoring device 52. However, in certain embodiments, the feedback device 66 may rely upon the processor 62 of the travel speed monitoring device 52. In some embodiments, the feedback device 66 includes a human machine interface (HMI) 72. In some embodiments, the HMI 72 includes a display of that may provide a visual indicator of the travel speed of the welding torch 26 based on the travel speed determined by the travel speed monitoring device 52. In certain embodiments, display of the HMI 72 may be located in a welding helmet used during welding in the weld area 58. In some embodiments, the display may be separate from the welding helmet, such as a mounted display visible from within the weld area. Furthermore, the HMI 72 may include haptic feedback to the user via gloves, helmet, or the welding torch 26. The HMI 72 may be used to provide visual, haptic, and/or audible indicators of the travel speed of the welding torch 26 directly to the welding operator as the operator is performing the weld and/or indications that the operator's travel speed is too slow, too fast, or in an appropriate range for a particular weld. The processor 62 may receive additional sensor feedback 84 from the welding system 10, in order to monitor other welding parameters. These other welding parameters may include, for example, a heat input to the workpiece 14.

As illustrated, the processor 62 is coupled to a memory 74, which may include one or more software modules 76 that contain executable instructions, transient data, input/output correlation data, and so forth. The memory 74 may include non-transitory, computer-readable medium, such as volatile or non-volatile memory. Furthermore, the memory 74 may include a variety of machine readable and executable instructions (e.g., computer code) configured to provide a calculation of weld travel speed, given input sensor data. Generally, the processor 62 receives such sensor data from the one or more sensors 54, 56 and/or the processor(s) 55, and references data stored in the memory 74 to implement such calculations. In this way, the processor 62 is configured to determine a travel speed of the welding torch 26, based at least in part on the signals 60.

In some embodiments, the travel speed sensing system 50 may be provided as an integral part of the welding system 10 of FIG. 1. That is, the travel speed sensing system 50 may be integrated into a component of the welding system 10, for example, during manufacturing of the welding system 10. For example, the power supply 16 may include appropriate computer code programmed into its software to support the travel speed sensing system 50. However, in other embodiments, the travel speed sensing system 50 may be provided as a retrofit kit that may enable existing welding systems 10 with the travel speed sensing capabilities described herein. The retrofit kit may include, for example, the travel speed sensing system 50, having the processor 62 and the memory 74, as well as one or more sensors 54 which may be attached to the welding torch 26 from which the travel speed sensing system 50 receives sensor input. In some embodiments, the retrofit kit may also include a welding torch 26 having the sensors 54 installed. To that end, such retrofit kits may be configured as add-ons that may be installed onto existing welding systems 10, providing travel speed sensing capabilities. Further, as the retrofit kits may be installed on existing welding systems 10, they may also be configured to be removable once installed.

Figure 3:
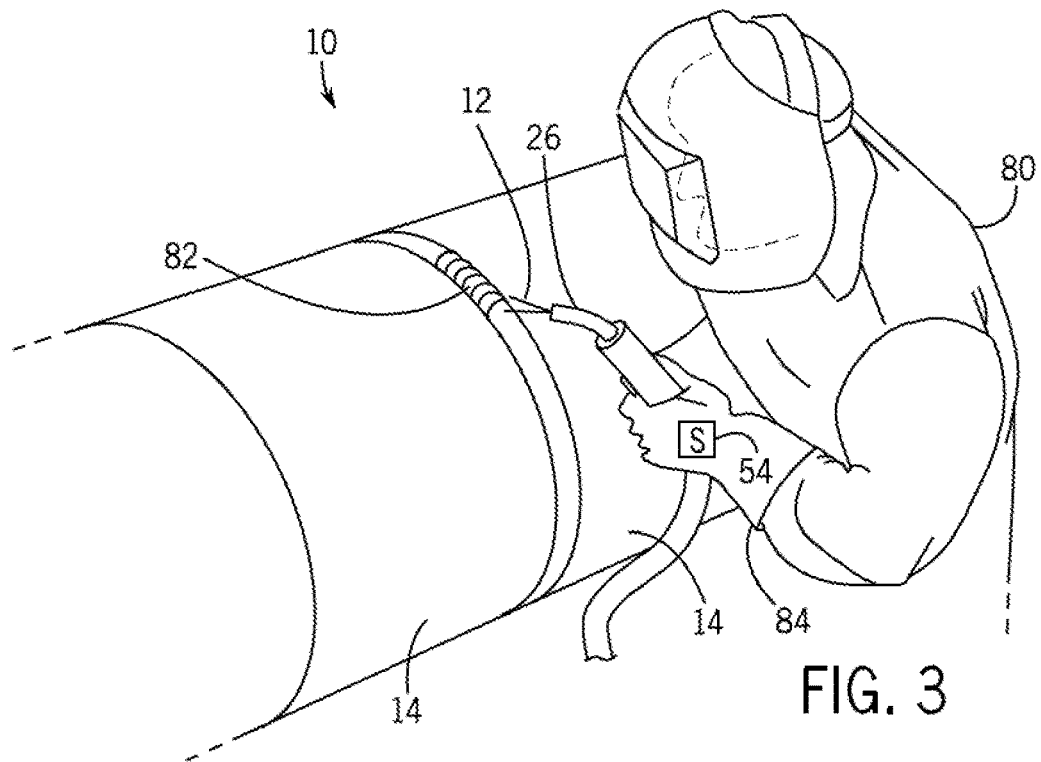
FIG. 3 is a perspective view of an embodiment of the welding system of FIG. 2 used to determine travel speed of the welding torch around a pipe.
Figure 4:
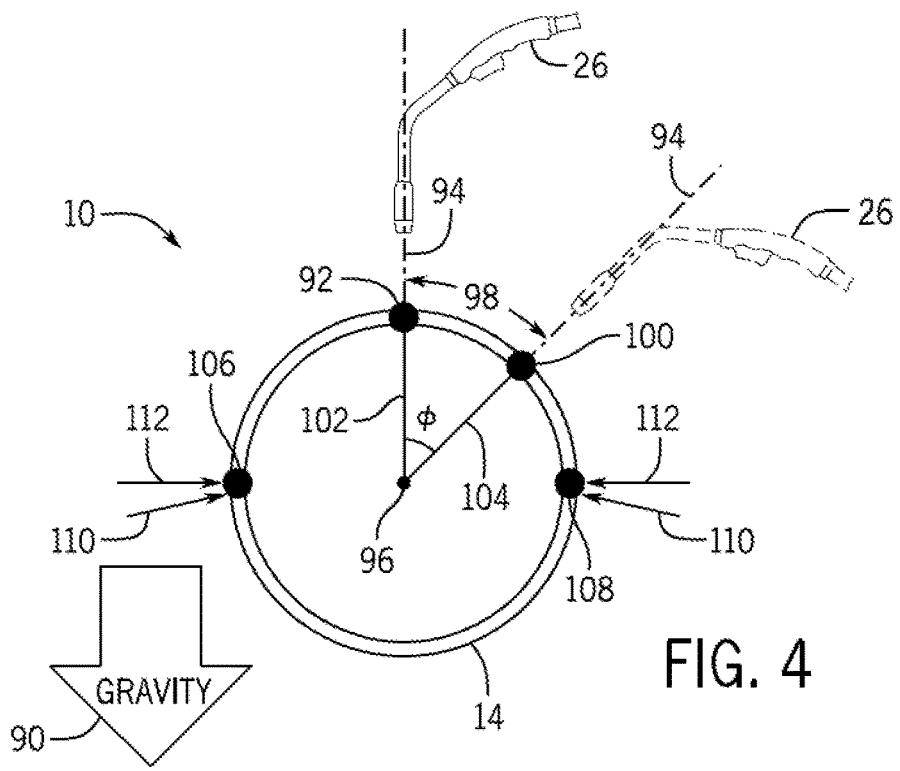
FIG. 4 is a cross-sectional view of an embodiment of a weld joint welded using the welding system of FIG. 2.

FIG. 3 illustrates an embodiment of the welding system 10 that may use the travel speed sensing system 50. The travel speed sensing system 50 may determine the weld travel speed of the welding torch 26 while an operator 80 forming a weld 82 on the workpiece 14 (e.g., pipe). In the illustrated embodiment, the sensors 54 are located on and/or in gloves 84 of the operator 80 in addition or alternative to placement in the welding torch 26. As illustrated, the weld 82 may be formed on a cylindrical-shaped workpiece 14 with the welding torch 26 substantially perpendicular or at a generally known angle to the workpiece 14 during formation of the welded connection on the workpiece 14 that has a known diameter. Using the known diameter an orientation based on a travel profile between the workpiece 14 and the welding torch 26, a travel speed may be determined over time based on an orientation of the welding torch 26 using torch geometry, such as the cross-sectional view of an embodiment of the welding system 10 illustrated in FIG. 4. During operation, the welding torch 26 experiences a downward force 90 associated with gravity. The direction of the downward force 90 may be detected by the sensors 54 (e.g., accelerometer 38) for use in determining a travel speed of the welding torch 26. For example, when the welding torch 26 is placed at an initial location 92 at a substantially perpendicular or other angle with the workpiece 14, a torch axis 94 passes substantially through a center point 96 of the workpiece 14 for the cross-section (e.g., two-dimensional slice) of the workpiece 14. As the welding torch 26 travels a travel distance 98 to a second location 100 around an outer diameter of the workpiece 14 while maintaining a desired orientation with respect to the workpiece 14, the torch axis 94 continues to pass through the center point 96. In other words, the torch axis 94 may extend through a radius 102 (or known or assumed orientation) at the initial location 92 and through a radius 104 (or other known or assumed orientation at the second location 100. The distance 98 may be determined as a function of an angle ϕ between the radii 102 and 104 and the length of the radii 102 and 104 according to the following function:

$$d = r * \phi \quad \text{(Equation 1)},$$

where d is a length of the travel distance 98, r is a length of the radii 102 and 104, and ϕ is the angle between the radii 102 and 104 measured in radians. In some embodiments, the length of the radii 102 and 104 may be known (e.g., in a job information database) and/or input into the welding system 10 by an operator. Furthermore, the travel speed may be determined by dividing the travel distance 98 by the time interval of travel that the travel speed monitoring system 50 determines that the welding torch 26 traveled between the initial location 92 and the second location 100.

To determine a measure of the angle ϕ, the sensors 54 may measure a change in a direction of gravity in relation to the torch axis 94 direction during travel from the initial location 92 to the second location 100. In other words, the angle ϕ may be determined as the angle between an initial orientation of the torch axis 94 at the initial location 92 and a second orientation of the torch axis 94 at the second location 100. Although perpendicular orientation may be used at some locations around the workpiece 14, in some locations, such as locations 106 and 108, alternative orientations may be used or desirable. For example, at locations 106 and 108, a MIG torch may have a slight torch angle from torch orientations 110 to push a puddle of welding material up to compensate for the downward force 90 on the welding material. In such embodiments, a travel profile may be used to compensate for the difference between the torch orientations 110 and perpendicular orientations 112 to provide a desired travel pace at certain points around the workpiece 14.

Figure 5:
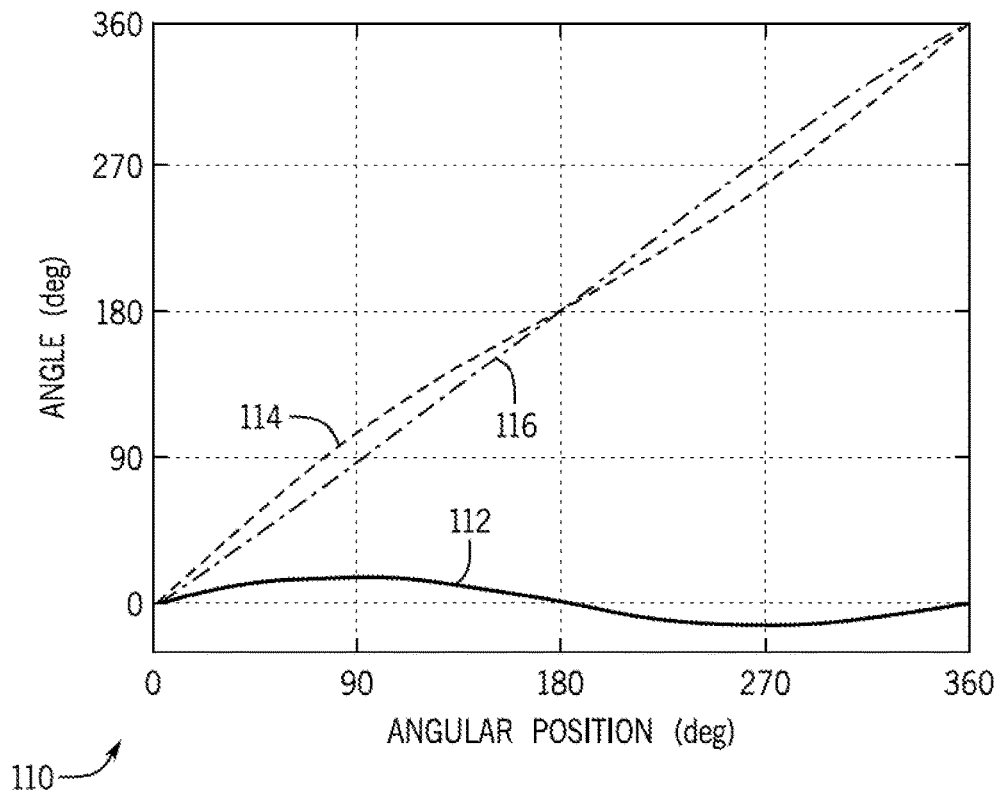
FIG. 5 is a view of an embodiment of a travel profile used to determine travel speed of the welding torch of FIG. 2.

FIG. 5 illustrates an embodiment of a travel profile 110 that reflects expected travel around a pipe (e.g., workpiece 14). A travel angle 112 may be chosen as perpendicular or with variations to account for various factors (e.g., gravity effect on weld material at vertically oriented weld locations). In some embodiments, the travel angle 112 may be a standard torch angle deflection. In certain embodiments, the travel angle 112 may be manually entered or may be determined from a teaching operation performed prior to welding. For example, the travel angle 112 may be determined using the sensors 56 or the training methods disclosed in U.S. Patent Publication No. 2013/0206741 filed on Jan. 31, 2013, which is herein incorporated by reference in entirety. Furthermore, the travel angle 112 may be tailored for a specific operator through the training operation to more accurately determine a position around the pipe (e.g., workpiece 14) based on the operator's personal technique at various locations around the pipe.

In the illustrated embodiment, the travel angle 112 starts at an angular position of 0° (e.g., 12 o'clock position) with an angle of 0° off perpendicular. However, as the welding torch 26 approaches an angular position of 90° (e.g., 3 o'clock position), the angle may increase to a degree of deflection (e.g., 15°) configured to push welding material in an upward direction to counteract gravity. The angle may return towards 0° off of perpendicular near the angular position of 180° (e.g., 6 o'clock position), but the welding torch 26 may deflect downwards (e.g., −15°) nearer to the angular position of 270° (e.g., 9 o'clock position) to again compensate for the force of gravity on the welding material. Using the travel angle 112, an expected orientation angle 114 with respect to the original torch axis 94. The expected orientation angle 114 may reflect changes in the travel angle 112 that reflects a variation (e.g., due to operator techniques) from a constant perpendicular orientation angle 116 around the pipe. As illustrated, variations in the selected travel angle 112 correspond to similar variations in the orientation angle.

As illustrated, for piping and similar workpieces, the travel path 112 and expected orientation angle 114 may be a continuous sinusoidally-shaped line. However, an actual orientation angle may be discrete based on a number of sampled locations and orientations over time. However, in some embodiments, the samplings may be exposed to a low-pass filtering, time-based running average filtering, or predictive Kalman filters to filter out unwanted information other than the relatively slowly changing orientation angle. The filtering may be performed using hardware or software filters. Furthermore, average torch orientation may be calculated at longer intervals (e.g., several seconds) to focus on the changes to the relatively slowly changing orientation angle.

Moreover, the actual orientation angle may be further refined by fusing information from one or more other sensors, such as the sensors 56 and/or the gyroscope 40. For example, by using the gyroscope 40, such as a triaxial gyroscope sensor, the rotation rate of the torch about 3 orthogonal axes may integrated in time to obtain an estimate of the current angle that can be combined with accelerometer signals to improve the accuracy of the determined angle of orientation by correcting for sensor errors, drift, and dynamic accelerations.

Figure 6:
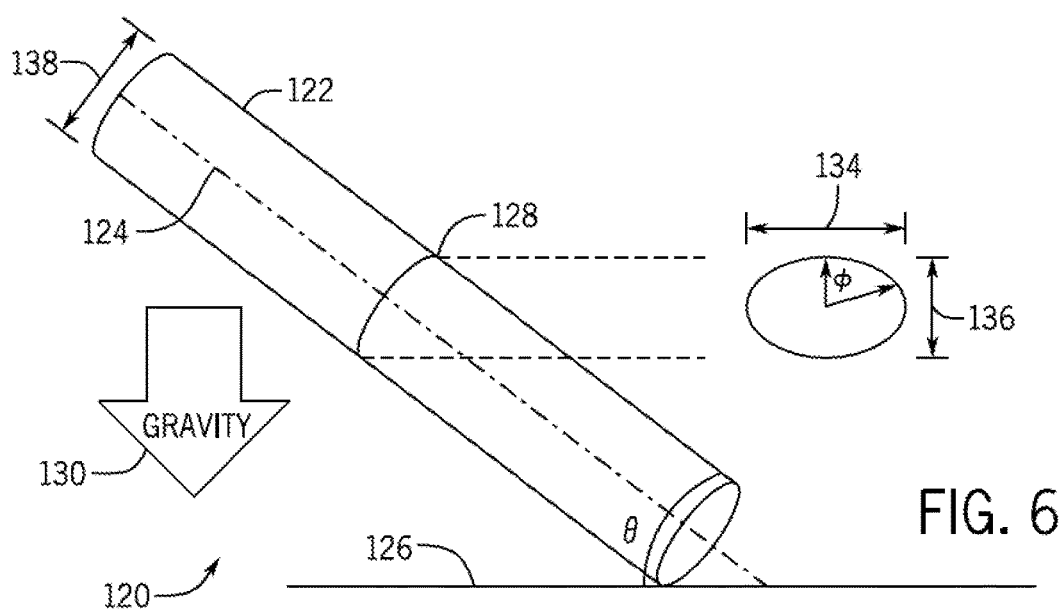
FIG. 6 is a perspective view of an embodiment of a pipe with an inclination angle that may be welded using the welding system of FIG. 2.

The foregoing discussion discusses pipes that are substantially parallel to the ground. However, a further analysis may be used to determine orientation angles for pipes that are not parallel to the ground. For example, in the welding system 120 of FIG. 6. A center vector 122 of the pipe 124 forms an angle θ with the ground 126, where 0°<θ<90°. Although in the illustrated embodiment, the pipe 124 contacts the ground 126, certain embodiments of the welding system 120, the pipe 124 may not contact the ground 126. Instead, the angle θ indicates an extension of the center vector 122 and/or an edge of the pipe 124. A plane formed by the weld joint 128 of the pipe 124 may be perpendicular to the center vector 122 as a circle. However, when the weld joint 128 is projected onto a plane defined by the direction of the force of gravity 130, a projected weld joint 132 on the plane may form an ellipse. Since the projected weld joint 132 is an ellipse, the projected weld joint 132 has a major diameter 134 and a minor diameter 136. The major diameter 134 is the same length as a diameter 138 of the pipe 124. However, the minor diameter 136 varies based on the value of angle θ and may be determined using the following equation:

$$d_{minor} = d_{major} * \cos(\theta) \quad \text{(Equation 2)},$$

where $d_{minor}$ is the length of the minor diameter 136 and $d_{major}$ is the length of the major diameter 134. Using $d_{minor}$ and $d_{major}$, a distance traveled on the pipe around the ellipse may be determined or approximated. For example, in some embodiments, the distance traveled on the perimeter of the ellipse may be approximated using the following equation:

$$\text{distance} = \phi * \sqrt{\frac{d_{major}^2 + d_{minor}^2}{8}} . \quad \text{(Equation 3)}$$

In certain embodiments, the distance traveled on the perimeter of the ellipse may be approximated using the following equation:

$$\text{distance} = \frac{\phi}{8}\left[6(d_{major} + d_{minor}) - \sqrt{3d_{major} + 10d_{major} * d_{minor} + 3d_{minor}}\right]. \quad \text{(Equation 4)}$$

In some embodiments, other suitable elliptical perimeter approximation formulas may be used by multiplying the perimeter by $\phi/2\pi$.

In some embodiments, the measure of angle $\theta$ may be known and/or input by an operator for the welding system 120. In certain embodiments, the angle $\theta$ may be determined using the welding system 120, such as welding torch 26. For example, the welding torch 26 may be laid on the pipe 124 so that the orientation sensors 54 of the welding torch 26 may be used to determine the angle $\theta$ prior to welding the pipe 124.

Using the projected weld joint 132 model, the travel speed for the welding torch 26 around a pipe 124 may be determined even when the pipe is not parallel to the ground 126 (that is, generally perpendicular to the force of gravity). Although the previous discussion pertains to welding around a whole circumference of a pipe, the foregoing techniques may be applied to arc-shaped segments encompassing part of the circumference around a pipe. In fact, a circular pipe may be subdivided into two or more sub-arcs that may have separate expectations as the total pipe joint is welded. For example, the travel path 112 may be sub-divided into four distinct sub-segments that may be welded at one time or at different times.

Figure 7:
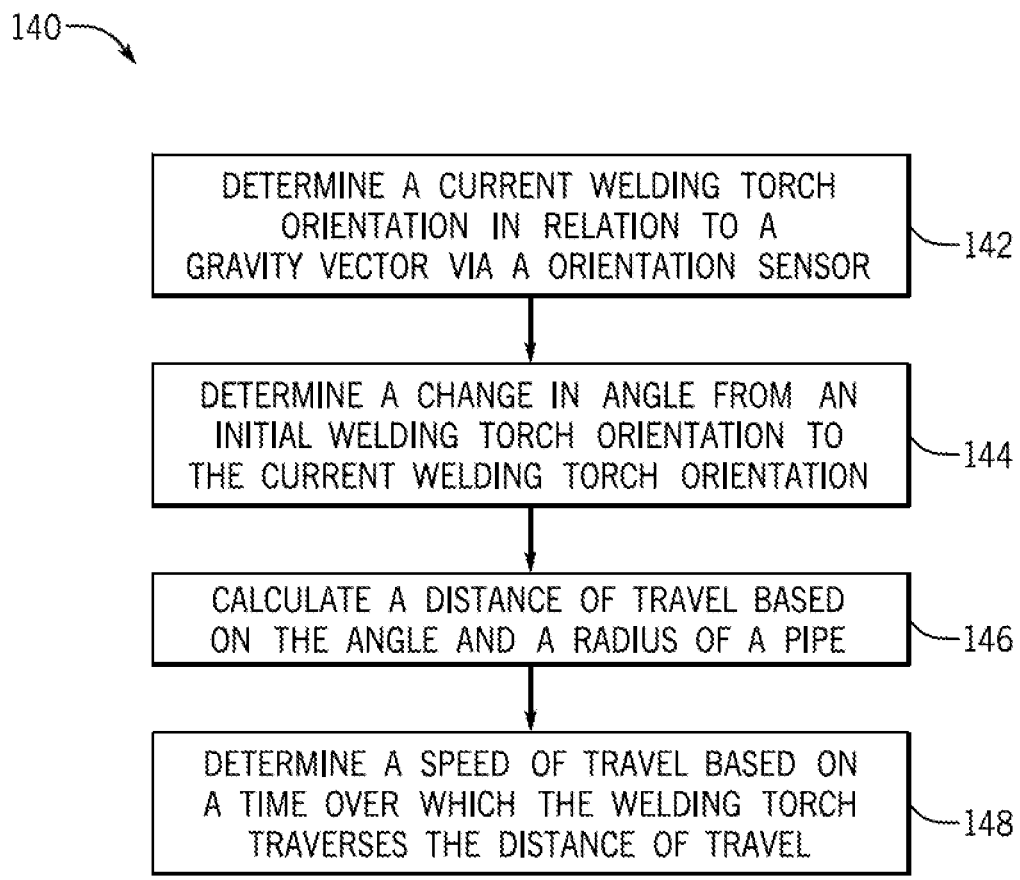
FIG. 7 is a block diagram of an embodiment of a speed sensing system that may be used to determine a weld travel speed or travel distance of a welding torch.

FIG. 7 illustrates an embodiment of a process 140 for determining a travel speed of a welding torch 26 during welding of a pipe 124. The process 140 may be implemented using the processors 55, 62, and/or 70. In some embodiments, the processors 55, 62, and/or 70 implement instructions stored in the memory 74 and/or 68. In certain embodiments, the processors 55, 62, and/or 70 may perform the process 140 as hardware, software, or some combination thereof. The process 140 includes determining a current welding torch orientation in relation to a gravity vector using one or more orientation sensors 54 (block 142). In some embodiments, the orientation sensors 54 may include one or more accelerometers 38 and/or one or more gyroscopes 40. In some embodiments, the measurements from the orientation sensors 54 may be fused with additional measurements from other sensors (e.g., sensors 56). Using the determined orientation, determine a change from an initial welding torch orientation to the current welding orientation (block 144). In some embodiments, the change includes an angular change in one or more orthogonal axes (e.g., using a triaxial accelerometer) that is indicative of movement of the welding torch 26 during operation.

Using the determined change and a radius of the pipe 124, the process 140 includes calculating a distance of travel based on the angle and the radius (block 146). In certain embodiments, the radius of the pipe 124 may be input and/or known before welding. In some embodiments, the radius of the pipe 124 may be determined by scanning a bar code, QR code, RFID (radio field identification), or other suitable data conveying devices that may be located on or near the pipe. In certain embodiments, scans are used to identify a job information database that stores information about the pipe 124, such as its radius. In certain embodiments, calculating the distance of travel includes calculating the distance of travel based on a travel angle profile. In some embodiments, the travel angle profile may correspond to a standard travel profile for a particular weld connection and geometry. In certain embodiments, the travel angle profile may be learned by the welding system 10 using a teaching operation that reflects techniques specific to an operator or configured to compensate for various factors (e.g., gravity effect on welding material). The process 140 further includes determining a speed of travel based on a time over which the welding torch traverses the distance of travel (block 148). In some embodiments, the speed of travel may be averaged across multiple determinations of distance and/or determined over periods of computation, such as 1, 2, 3, 4, or more seconds.

The determined travel speed may provide documentation for weld quality based at least in part on linear input and power input. The travel speed may also be used to provide real-time feedback to an operator via the feedback device 66 reflecting the weld progression. Additionally, it should be noted that in certain embodiments, it may be desirable to determine and monitor the travel speed of the welding torch 26 over the total distance of the workpiece 14 being welded, and not the total distance traveled by the welding torch 26. That is, in instances in which the operator 110 performs a weld in a traditional pattern, such as weaving, the welding torch 26 may travel a large distance while only covering a small portion of the workpiece 14. If such a technique is used by the operator 110, the interpretation of the weld travel speed may be adjusted to compensate for the weaving motion to derive the travel speed along a travel direction (X) of the weld. Therefore, in some embodiments, the weld travel speed will not simply be the sum of the length of the weld vector. Instead, the algorithm for calculating weld travel speed may continually determine the straight line or planar distance between a current weld location and some prior reference location and divide this distance by the elapsed weld time between the two locations. The elapsed time between points may be held constant, or the initial reference point may be held constant at a weld initiation location. In some embodiments, the elapsed time between the two locations may be adjusted to be a longer time interval when weaving is detected.

In some embodiments, the distance between the current weld tip location and the prior reference location may be calculated, for example, by the Pythagorean Theorem if the displacements in the travel direction (X) and weave direction (Y) (or any two orthogonal directions on the weld surface) is known. If this distance is found to be non-monotonically increasing, then a weaving technique may be identified. Further, in embodiments in which a particular pattern (e.g., zigzag pattern) is being performed by the operator 110, the pattern may be identified by evaluating the excursions in the weave direction (Y) or the near lack of travel in the travel direction (X) for some periods of time. The amount of weaving might also be detected by sensing the excursions in the weave direction (Y). For example, in an embodiment, the time between the current weld location and the prior reference location may be adjusted according to the amount of weaving detected (e.g., more weaving corresponds to a longer time). Additionally, any low-pass filtering or time averaging of the calculated travel speed may be adjusted (e.g., more weaving corresponds to a longer time or lower frequency filter).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
an orientation sensor associated with a welding torch, wherein the orientation sensor is configured to sense a welding torch orientation relative to a direction of gravity; and
one or more processors communicatively coupled to the orientation sensor and configured to:
determine an angular position of the welding torch relative to a pipe based at least in part on the welding torch orientation sensed by the orientation sensor and a radius of the pipe; and
determine an angular travel distance travelled by the welding torch from an initial position to the angular position based at least in part on the radius of the pipe, wherein the angular travel distance comprises a distance traveled along at least a portion of a circumference of the pipe.

2. The welding system of claim 1, wherein the one or more processors is configured to determine a travel speed of the welding torch based at least in part on the determined angular position.

3. The welding system of claim 1, wherein the orientation sensor comprises at least one accelerometer.

4. The welding system of claim 3, wherein the orientation sensor comprises at least one gyroscope configured to measure angular changes of the welding torch.

5. The welding system of claim 1, wherein the one or more processors is configured to determine the angular travel distance based at least in part on a travel profile for an operator or a job.

6. The welding system of claim 5, wherein the travel profile comprises a learned profile input using a teaching mode or an input travel profile.

7. The welding system of claim 5, wherein the travel profile comprises compensation for gravitational effects on welding material during a welding operation.

8. The welding system of claim 1, wherein the one or more processors determines the angular position of the welding torch in relation to an initial position using an equation as follows:

$$d = r * \phi$$

where d is the angular travel distance, r is a radius, and $\phi$ is an angle between a torch axis at the initial position and a torch axis at the angular position.

9. The welding system of claim 1, comprising a weld area sensor located within a weld area, wherein the weld area sensor is configured to also sense orientation of the welding torch, and the one or more processors is configured to determine the angular position based at least in part on measurements corresponding to sensed orientations from the orientation sensor and measurements corresponding to sensed orientations from the weld area sensor.

10. The welding system of claim 1, wherein the one or more processors is configured to receive an indication of the radius from a job information database or manual input from a user.

11. A welding system, comprising:
an orientation sensor associated with a welding torch, wherein the orientation sensor is configured to sense a welding torch orientation relative to a direction of gravity; and
one or more processors communicatively coupled to the orientation sensor and configured to:
determine an angular change in orientation of the welding torch relative to a pipe based at least in part on the welding torch orientation sensed by the orientation sensor and a radius of the pipe; and
determine a travel speed of the welding torch based on a travel distance from an initial location to an angular location determined using the angular change and a radius of the pipe at a weld joint.

12. A welding system, comprising:
an orientation sensor associated with a welding torch, wherein the orientation sensor is configured to sense a welding torch orientation relative to a direction of gravity; and
one or more processors communicatively coupled to the orientation sensor and configured to:
determine an initial orientation of the welding torch at an initial location of a pipe;
determine an angular orientation of the welding torch at an angular location of the pipe;
determine an angular change in orientation between the initial orientation and the angular orientation; and
determine a travel speed of the welding torch based on the angular change from the initial location to the angular location.

13. The welding system of claim 12, wherein the one or more processors are further configured to determine a travel distance using an equation as follows:

$$d = r * \varphi,$$

where d is the travel distance, r is a radius of the pipe, and $\varphi$ is an angle between a torch axis at the initial location and the torch axis at the angular position.

14. The welding system of claim 12, wherein the one or more processors are further configured to compensate for a pipe that is not parallel to a ground surface using an equation as follows to determine a minor diameter of an ellipse formed by a projection of a weld joint onto a plane perpendicular the ground surface:

$$d_{minor} = d_{major} * \cos(\theta),$$

where $d_{minor}$ is a minor diameter of an ellipse, $d_{major}$ or is twice a radius of the pipe, and $\theta$ is an inclination angle of the pipe.

15. The welding system of claim 14 wherein the one or more processors are further configured to determine the inclination angle by placing the welding torch on the pipe and determining an inclination orientation of the welding torch using the orientation sensor.

16. The welding system of claim 12, wherein the one or more processors are further configured to determine travel distance based on the travel speed.

17. The welding system of claim 12, wherein the one or more processors are further configured to generate an indication of the travel speed to an operator moving the welding torch by:
providing visual feedback via a display;
providing audible feedback; or
providing haptic feedback.

* * * * *